(12) United States Patent
Zhao

(10) Patent No.: US 12,127,052 B2
(45) Date of Patent: Oct. 22, 2024

(54) FREQUENCY BAND SWITCHING METHOD, APPARATUS, TERMINAL DEVICE, COMMUNICATION NODE AND COMPUTER READABLE STORAGE MEDIUM

(71) Applicant: XI'AN ZHONGXING NEW SOFTWARE CO. LTD., Xi'an (CN)

(72) Inventor: Ni Zhao, Guangdong (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 233 days.

(21) Appl. No.: 17/523,903

(22) Filed: Nov. 10, 2021

(65) Prior Publication Data

US 2022/0070742 A1 Mar. 3, 2022

Related U.S. Application Data

(63) Continuation of application No. PCT/CN2020/098663, filed on Jun. 29, 2020.

(30) Foreign Application Priority Data

Jul. 1, 2019 (CN) .......................... 201910585928.3

(51) Int. Cl.
*H04W 36/00* (2009.01)
*H04W 52/36* (2009.01)

(52) U.S. Cl.
CPC . *H04W 36/0072* (2013.01); *H04W 36/00837* (2018.08); *H04W 52/365* (2013.01); *H04W 52/367* (2013.01)

(58) Field of Classification Search
CPC ....... H04W 36/0072; H04W 36/00837; H04W 52/365; H04W 52/367; H04W 52/40;
(Continued)

(56) References Cited

U.S. PATENT DOCUMENTS 9,357,448 B1 5/2016 Narendran et al.
2014/0073329 A1* 3/2014 Kang .................... H04W 36/30
455/439
(Continued)

FOREIGN PATENT DOCUMENTS

CN 105025520 A 11/2015
CN 105101330 A 11/2015
(Continued)

OTHER PUBLICATIONS

Chinese Second Office Action dated Jun. 20, 2023 in corresponding Chinese Application No. 201910585928.3, translated, 22 pages.

(Continued)

*Primary Examiner* — Afshawn M Towfighi
(74) *Attorney, Agent, or Firm* — MH2 TECHNOLOGY LAW GROUP LLP

(57) ABSTRACT

The present disclosure provides a frequency band switching method, an apparatus, a terminal device, a communication node and a computer-readable storage medium. The frequency band switching method comprises: determining a need for switching a frequency band of an uplink operation according to transmission power information of a terminal device when the uplink operation of the terminal device is performed in a first frequency band; performing, by the terminal device, a beam scanning for a second frequency band to switched to; and switching, by the terminal device, to the second frequency band according to a beam scanning result.

18 Claims, 10 Drawing Sheets

(58) Field of Classification Search
CPC ..... H04W 36/16; H04W 36/06; H04W 48/16; H04W 36/0058; H04W 36/0085; H04W 36/30; H04W 52/0209; H04B 17/12
See application file for complete search history.

(56) References Cited

U.S. PATENT DOCUMENTS

| | | | |
|---|---|---|---|
| 2018/0191544 A1* | 7/2018 | Umehara | H04W 72/0446 |
| 2018/0343624 A1 | 11/2018 | Akula et al. | |
| 2019/0053080 A1 | 2/2019 | Ryu et al. | |
| 2019/0327768 A1* | 10/2019 | Kim | H04W 74/006 |
| 2020/0281022 A1* | 9/2020 | Pelletier | H04W 52/367 |

FOREIGN PATENT DOCUMENTS

| | | |
|---|---|---|
| CN | 105491624 A | 4/2016 |
| CN | 105898813 A | 8/2016 |
| CN | 106060870 A | 10/2016 |
| CN | 108174422 A | 6/2018 |
| WO | 2019099361 A1 | 5/2019 |
| WO | 2019099463 A1 | 5/2019 |
| WO | 2019099709 A1 | 5/2019 |

OTHER PUBLICATIONS

ZTE Corporation, Extended European Search Report, EP 20834599.1, May 27, 2022, 15pgs.

3rd Generation Partnership Project; Technical Specification Group Radio Access Network; NR; Medium Access Control (MAC) protocol specification (Release 15), Jun. 29, 2019, 78pgs.

Chinese First Office Action dated Dec. 1, 2022 in corresponding Chinese Application No. 201910585928.3, translated, 15 pages.

ZTE Corporation, International Search Report, PCT/CN2020/098663, Sep. 14, 2020, 6 pgs.

* cited by examiner

- ◉ UE uplink main transmitting antenna
- ● BS +45° polarized antenna
- ○ BS -45° polarized antenna

FREQUENCY BAND SWITCHING METHOD, APPARATUS, TERMINAL DEVICE, COMMUNICATION NODE AND COMPUTER READABLE STORAGE MEDIUM

CROSS REFERENCE TO RELATED APPLICATIONS

The present application is a continuation of PCT Patent Application No. PCT/CN2020/098663, filed Jun. 29, 2020, which claims the priority of Chinese patent application No. 201910585928.3 filed with the Chinese Patent Office on Jul. 1, 2019, each of which is incorporated herein by reference in its entirety.

TECHNICAL FIELD

The present disclosure relates to a frequency band switching method, an apparatus, a terminal device, a communication node and a computer-readable storage medium.

BACKGROUND

With the gradual development of the 4th generation mobile communication technology (4G) and the emergence of the 5th generation mobile communication technology (5G), the coexistence of 4G and 5G networks will last for a long time in the future. In this complex network environment, terminal devices play an important role in communication. Under the background of high speed, low latency, high reliability and super bandwidth in the 5G era, and as the gradual development of advanced technologies such as autonomous driving, augmented reality (AR), virtual reality (VR), telemedicine and machine-to-machine (M2M), higher requirements on the energy consumption of the terminal are put forward.

In terms of reducing power consumption of the terminal, power amplifiers with low power consumption (PA) are used in the back-end to reduce the frequencies of the central processing unit (CPU) and graphics processing unit (GPU); and in terms of software, the sleep of some application is controlled to achieve the purpose of reducing the power consumption of the terminal.

With the development of 5G, when 5G coverage rate is low, 5G terminals firstly selecting 5G network will cause mobile phones to frequently search for signals, aggravate the tasks of mobile phones to process information, and bring pressure on power consumption, and PA power consumption is also getting higher and higher. The power consumption reduction scheme in the related technology cannot meet the user's requirements for the endurance capability of the terminal.

SUMMARY

Some embodiments of the present disclosure provide a frequency band switching method, an apparatus, a terminal device, a communication node, and a computer-readable storage medium, so as to reduce a power consumption of the terminal device.

Some embodiments of the present disclosure provide a frequency band switching method, including: determining a need for switching a frequency band of an uplink operation according to transmission power information of a terminal device, when the uplink operation of the terminal device is in a first frequency band; performing, by the terminal device, a beam scanning for a second frequency band to switch to; switching, by the terminal device, to the second frequency band according to a beam scanning result.

Some embodiments of the present disclosure also provides a frequency band switching method, including: determining, by a communication node, a frequency band of an uplink operation of a terminal device according to transmission power information of the terminal device; acquiring, by the communication node, a beam scanning result of the terminal device; and switching, by the communication node, the terminal device from a first frequency band to a second frequency band according to the beam scanning result.

Some embodiments of the present disclosure also provide a frequency band switching apparatus, including: a transmission power measurement module, configured to determine a need for switching a frequency band of an uplink operation according to transmission power information of a terminal device, when the uplink operation of the terminal device is in a first frequency band; a beam scanning management module, configured to perform a beam scanning for a second frequency band to switch to; a frequency band switching module, configured to switch to the second frequency band according to a beam scanning result.

Some embodiments of the present disclosure also provide a frequency band switching apparatus, including: a determining module, configured to determine a frequency band of an uplink operation of a terminal device according to transmission power information of the terminal device; an obtaining module, configured to obtain a beam scanning result of the terminal device; a switching module, configured to switch the terminal device from a first frequency band to a second frequency band according to the beam scanning result.

Some embodiments of the present disclosure also provide a terminal device, including a memory, a processor, and a computer program stored in the memory and capable of running on the processor, where the computer program, when being executed by the processor, implements the method.

Some embodiments of the present disclosure further provide a communication node, including a memory, a processor, and a computer program stored in the memory and capable of running on the processor, where the computer program, when being executed by the processor, implements the method.

Some embodiments of the present disclosure also provide a computer-readable storage medium, storing a computer-executable instruction that is used to execute the method.

DETAILED DESCRIPTION

Embodiments of the present disclosure will be described with reference to the accompanying drawings below.

The steps shown in the flowcharts of the drawings may be executed in a computer system such as a set of computer-executable instructions. And, although a logical sequence is shown in the flowchart, in some cases, the steps shown or described may be performed in a different sequence than the sequence described herein.

Figure 1:
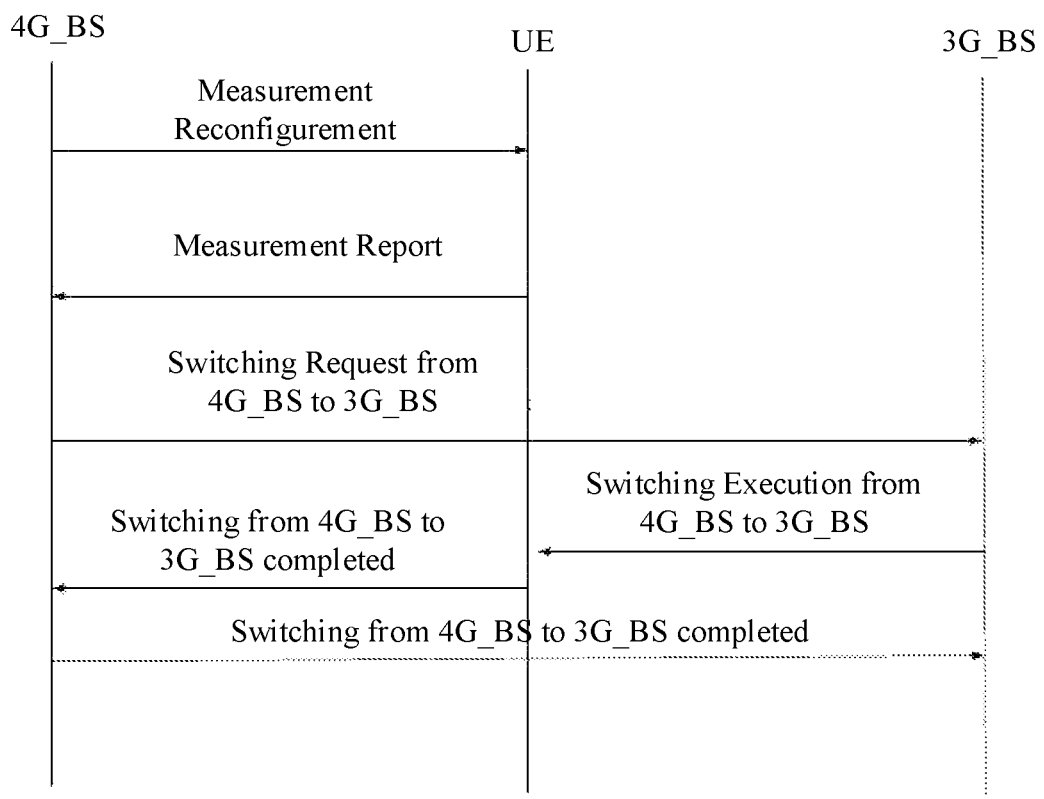
FIG. 1 is a schematic flowchart illustrating switching between 4G network and 3G network.

As shown in FIG. 1, FIG. 1 is a flowchart illustrating switching between 4G network and 3G network. Before switching from the 4G to 3G, a base station (BS) configures a neighbor relation between a 4G cell and a 3G cell, and the 4G cell obtains a physical cell identifier (PCI), an absolute radio frequency channel number (ARFCN) and other information of the 3G cell. Firstly, a 4G_BS configures related information (measurement object, measurement switching event, reference signal receiving power (RSRP) of measurement switching event, RSRP related threshold) for an UE (user equipment, that is, terminal device) by measurement reconfiguration. When the UE detects that a transmission signal of the base station meets a condition of a measurement configuration, the 4G_BS initiates a switching request to a 3G_BS, and the UE initiates a switching action on the 3G_BS, and notifies both the 4G base station and the 3G_BS after switching to the 3G cell. Then, a switching process ends. The entire switching is performed based on the signal strength of the 4G_BS and the 3G_BS monitored by the UE.

Some embodiments of the present disclosure provide a frequency band switching method, in which the switching may be performed based on the behavior of the UE. When a demodulation performance of the UE itself deteriorates, the UE may actively initiate the switching request to the base station to perform the frequency band switching.

Figure 2:
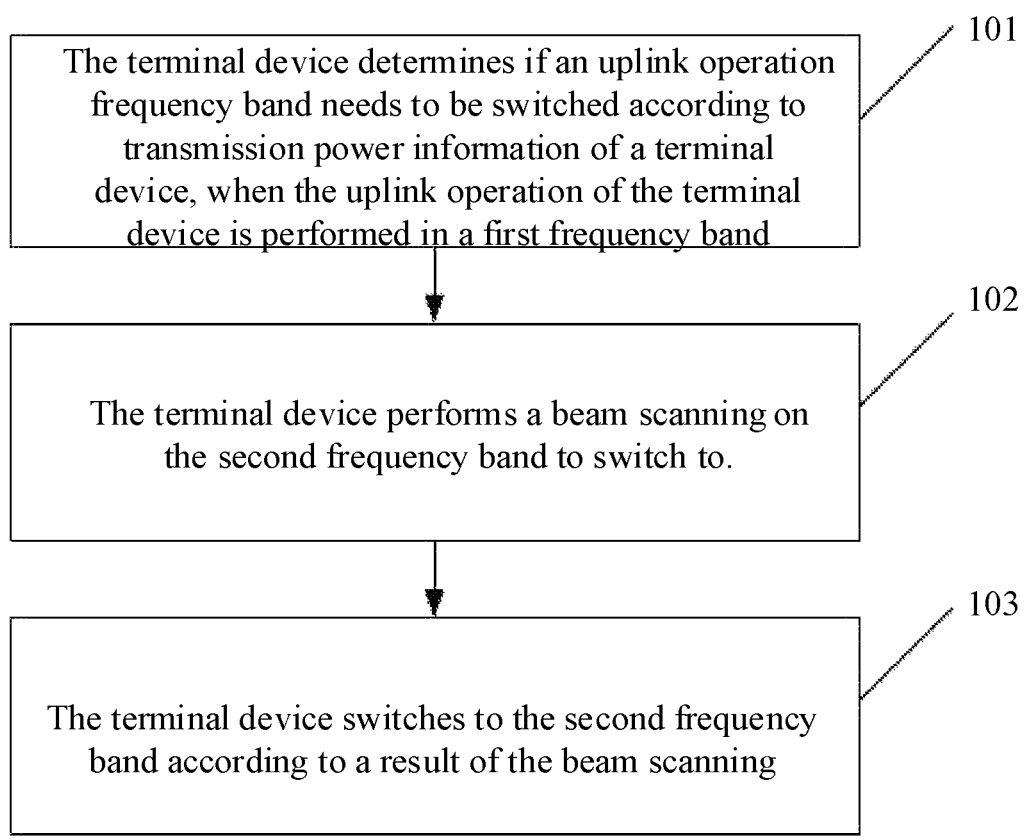
FIG. 2 is a schematic flowchart illustrating a frequency band switching method according to an embodiment of the present disclosure (applied to a terminal device)

As shown in FIG. 2, the frequency band switching method provided by some embodiments of the present disclosure may be applied to the terminal device, and the method includes the following steps.

In step 101, the terminal device determines whether an uplink operation frequency band needs to be switched according to transmission power information of a terminal device, when the uplink operation of the terminal device is performed in a first frequency band.

In some embodiments of the present disclosure, the terminal device switches from the first frequency band to a second frequency band according to the transmission power information.

In an embodiment, the first frequency band is a 5G frequency band, and the second frequency band is a 4G frequency band. Herein, the 5G frequency band is a high frequency band, and the 4G frequency band is a low frequency band.

Figure 3:
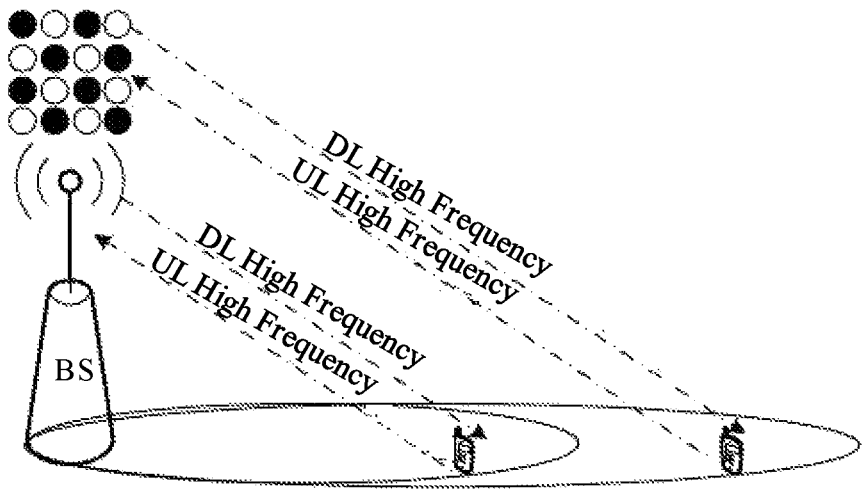
FIG. 3 is a schematic diagram illustrating a terminal device moving from a mid-to-far point to a far point according to an embodiment of the present disclosure
Figure 4:
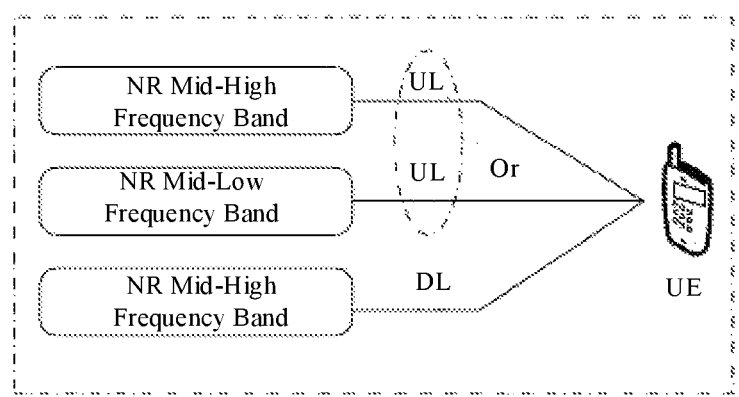
FIG. 4 is a schematic diagram illustrating an operating frequency band of a terminal device according to an embodiment of the present disclosure.

As shown in FIG. 3 and FIG. 4, in a scenario that 4/5G exist at the same time, when there is a large difference in the uplink and downlink coverage between mid-to-far points and far points, the uplink operation frequency band of the terminal device may be switched from 5G to 4G through the frequency band switching, which may improve uplink coverage, uplink traffic and uplink spectrum efficiency.

In some embodiments of the present disclosure, the terminal device may adopt two ways to determine whether the uplink operation frequency band needs to be switched.

First, the determination on whether the uplink operation frequency band needs to be switched is made independently by the terminal device.

Figure 5:
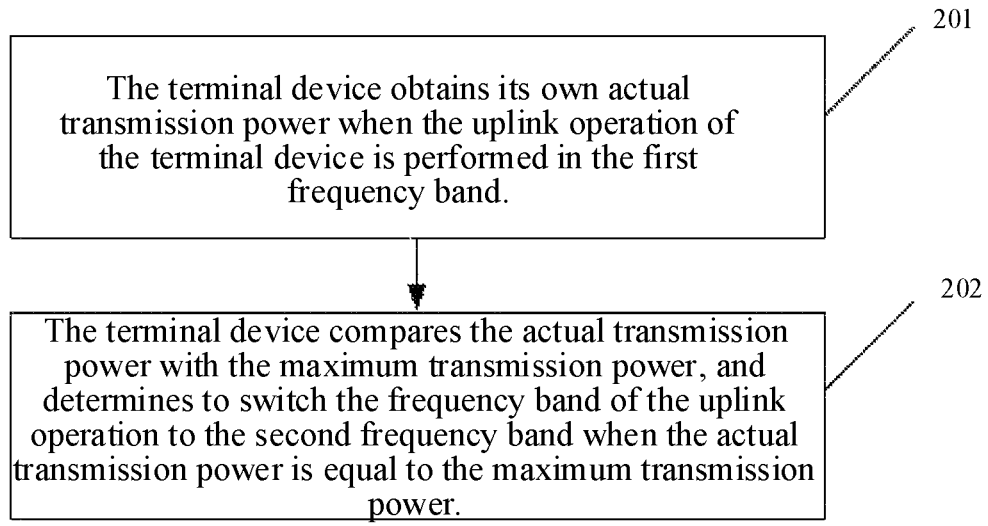
FIG. 5 is a schematic flowchart illustrating a method performed by a terminal device for determining whether an uplink operation frequency band needs to be switched, according to an embodiment of the present disclosure.

In an embodiment, the transmission power information includes an actual transmission power and a maximum transmission power. As shown in FIG. 5, the approach includes the following steps.

In step 201, the terminal device obtains its own actual transmission power when the uplink operation of the terminal device is performed in the first frequency band.

In step 202, the terminal device compares the actual transmission power with the maximum transmission power, and determines to switch the frequency band of the uplink operation to the second frequency band when the actual transmission power is equal to the maximum transmission power.

Second, the determination on whether the uplink operation frequency band needs to be switched is made according to an instruction of a communication node.

The communication node may be a base station.

Figure 6:
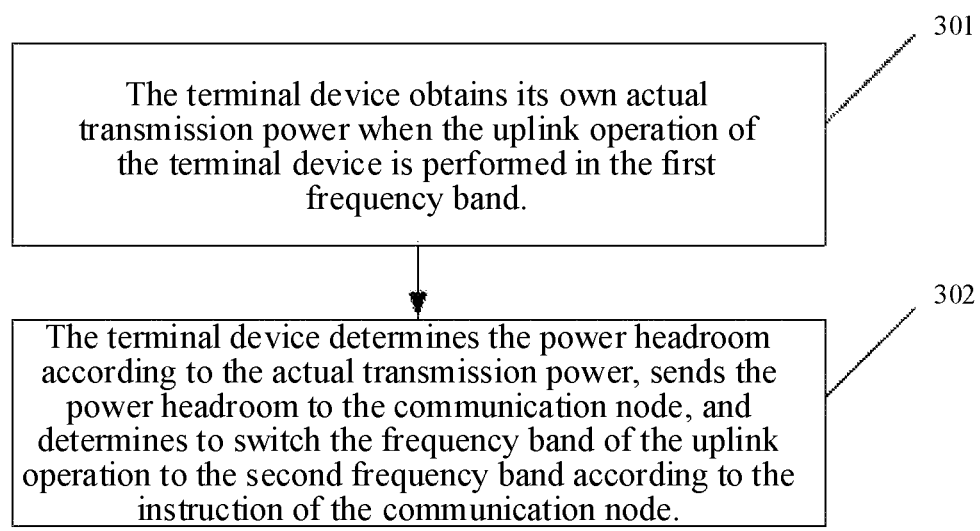
FIG. 6 is a schematic flowchart illustrating determining whether an uplink operation frequency band needs to be switched according to an instruction of a communication code, according to an embodiment of the present disclosure.

In an embodiment, the transmission power information includes a power headroom, and the power headroom is a difference between the maximum transmission power and the actual transmission power. As shown in FIG. 6, this method includes the following steps.

In step 301, the terminal device obtains its own actual transmission power when the uplink operation of the terminal device is performed in the first frequency band.

In step 302, the terminal device determines the power headroom according to the actual transmission power, sends the power headroom to the communication node, and determines to switch the frequency band of the uplink operation to the second frequency band according to the instruction of the communication node.

In step 102, the terminal device performs a beam scanning on the second frequency band to switch to.

In an embodiment, before the step 102, the method further includes: receiving, by the terminal device, a public broadcast message sent by a communication node, wherein the public broadcast message carries information of the second frequency band to which the terminal device is capable to switch.

In an embodiment, the terminal device may perform the beam scanning according to the information of the second frequency band that the terminal device may switch to and carried in the public broadcast message.

In an embodiment, the step 102 includes: scanning, by the terminal device, a frequency spectrum corresponding to each beam in the second frequency band separately to obtain a power corresponding to the each beam.

Figure 7:
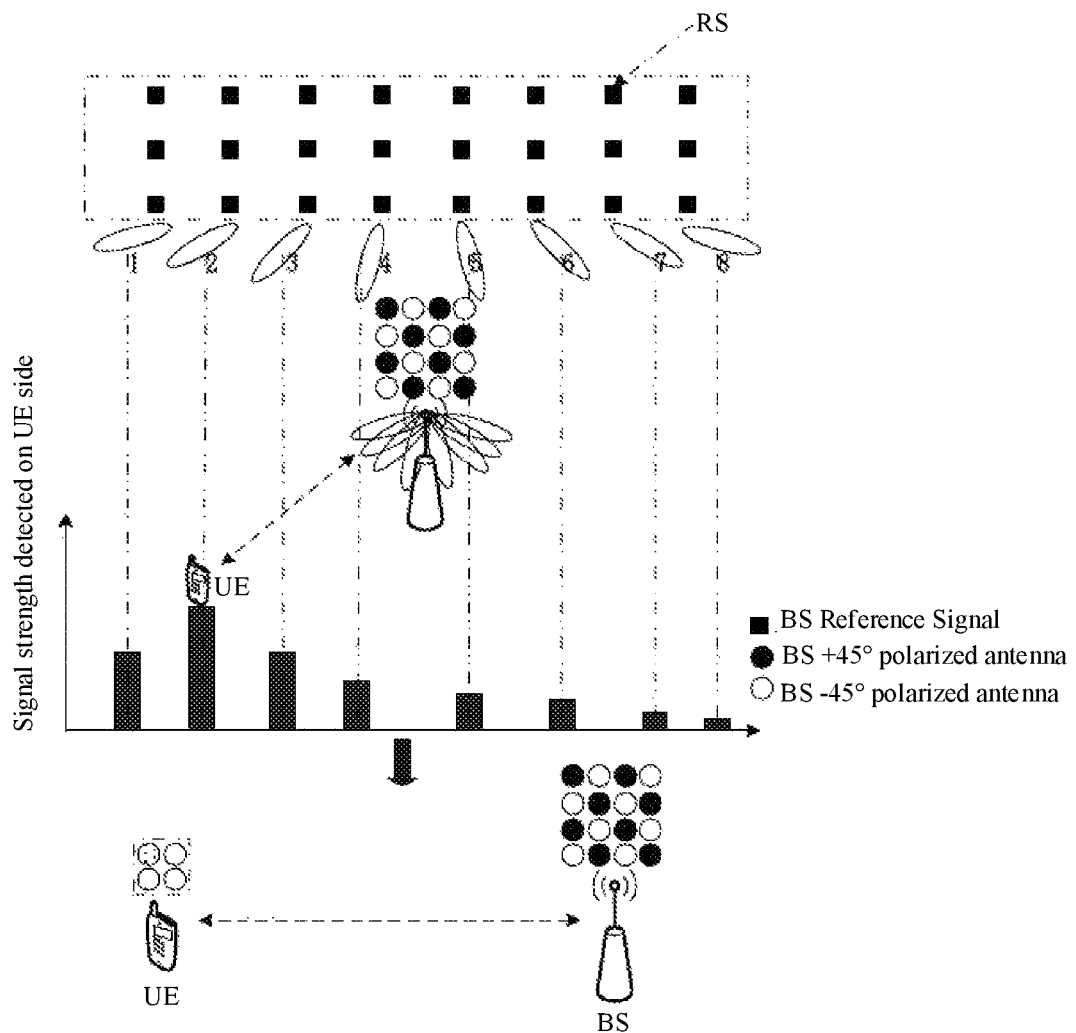
FIG. 7 is a schematic diagram illustrating a beam scanning according to an embodiment of the present disclosure.

As shown in FIG. 7, FIG. 7 is a schematic diagram illustrating the beam scanning. Taking the second frequency band having 8 beams as an example, the terminal device scans beams 1 to 8 respectively to obtain powers Power1 to Power8 corresponding to each beam of the 8 beams.

In step 103, the terminal device switches to the second frequency band according to a result of the beam scanning.

After obtaining the power corresponding to each of the beams, the terminal device reports an energy of the corresponding beam to the communication node, and the communication node switches to the second frequency band and instructs the terminal device to access.

Some embodiments of the present disclosure include: determining whether an uplink operation frequency band needs to be switched according to transmission power information of a terminal device, when the uplink operation of the terminal device is performed in a first frequency band; performing, by the terminal device, beam scanning on a second frequency band to switch to; switching, by the terminal device, to the second frequency band according to a result of the beam scanning. Some embodiments of the present disclosure perform the frequency band switching according to the transmission power information of the terminal device, which may reduce the power consumption of the terminal device and improve the utilization rate of the uplink spectrum.

In an embodiment, the step 103 includes: initiating, by the terminal device, an access to a direction of a strongest beam in the second frequency band according to the beam scanning result.

Herein, the terminal device initiates the access to the direction of the strongest beam of the communication node by scanning beams, and activates only one beam with the strongest signal or a superposition beam of the strongest signal beam and the strongest beam nearby during the entire service communication process. This mechanism may save the power consumption of the communication node and improve the centralized utilization of energy by the communication node.

In an embodiment, the method further includes: receiving, by the terminal device, signals of the communication node, and performing, by the terminal device, phase calibration and compensation.

The phase calibration and compensation of the terminal device may be performed in real time, which is used to eliminate a phase difference of communication components (radio frequency feeder, electronic components, etc.) of the terminal device, thereby improving the accuracy and reliability of 3D multi-input multi-output (MIMO) beamforming.

For the phase calibration and compensation of a feeder on the terminal device side, the terminal device receives signals of the communication node at radio frequency ports, measures a phase of each of the radio frequency ports obtained by receiving the signals, and respectively performs the compensation according to the obtained phase corresponding to each of the radio frequency ports.

Figure 8:
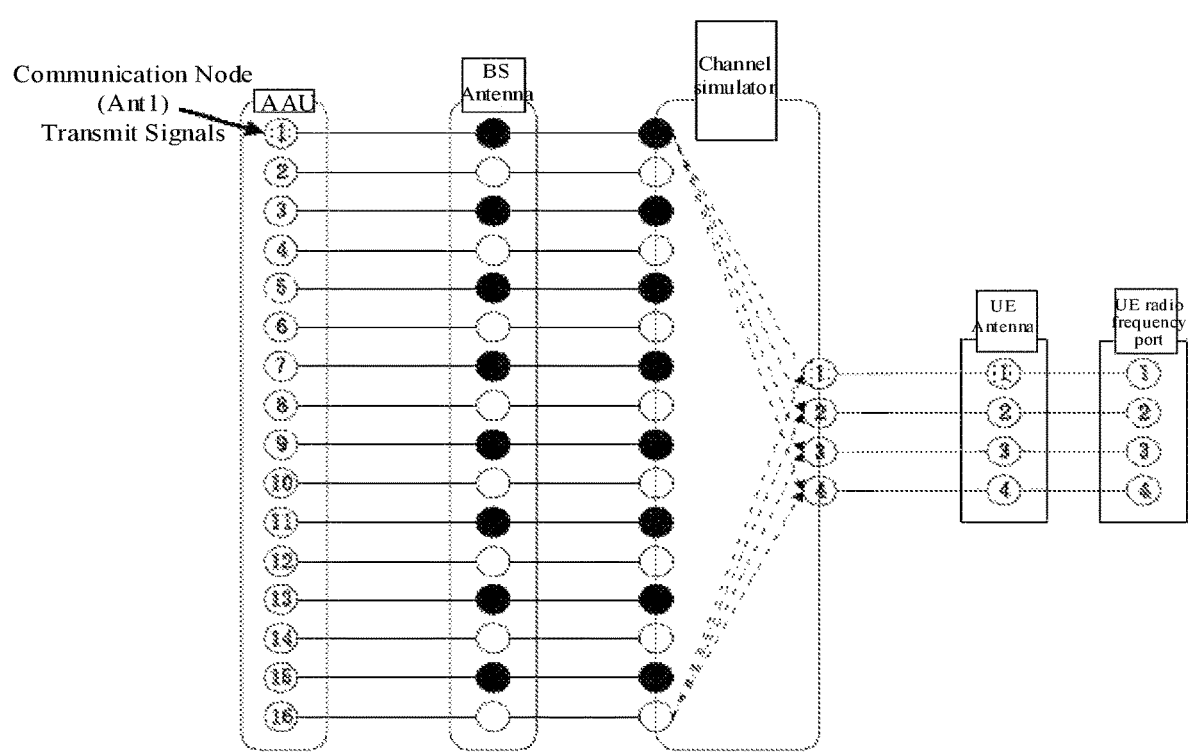
FIG. 8 is a schematic diagram illustrating phase calibration of a feeder on the terminal device side according to an embodiment of the present disclosure.

Referring to FIG. 8, taking the terminal device with 4 radio frequency ports as an example, the communication node includes 16 antenna ports, ANT1~ANT16. Signals are transmitted at ANT1 on the communication node side, the signals are received at frequency ports 1-4 on the terminal device side and phases delatPhase1, delatPhase2, delatPhase3, and delatPhase4 are measured and obtained. Then, -delatPhase1, -delatPhase2, -delatPhase3, -delatPhase4 are used to perform the compensation respectively to eliminate the phase difference of the feeder on the terminal device side.

For a downlink phase compensation on the communication node side, the terminal device sends the phase difference information to the communication node so that the communication node performs the downlink phase compensation. Specifically, the method includes: detecting, by the terminal device, phase difference information according to signals received from a communication node, and sending the phase difference information to the communication node, wherein the phase difference information comprises phase difference information of a −45° polarized antenna calibrated by taking a +45° polarized antenna as a reference, and phase difference information of the +45° polarized antenna calibrated by taking the −45° polarized antenna as the reference.

Figure 9:
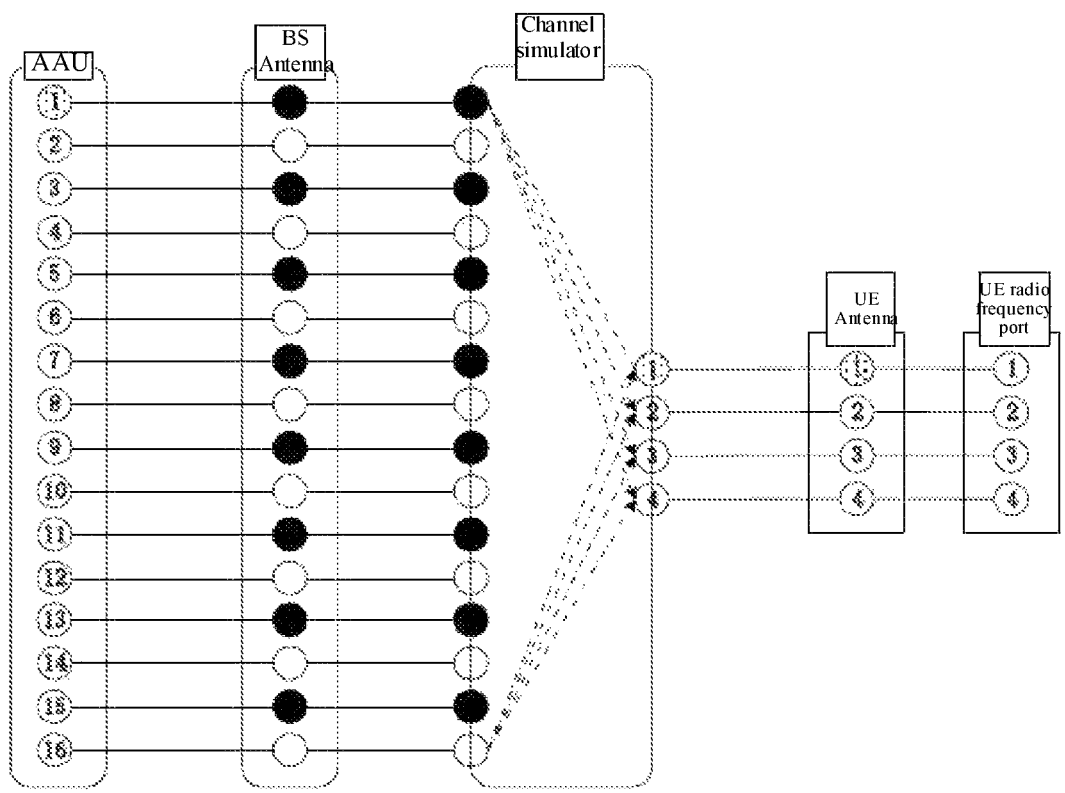
FIG. 9 is a schematic diagram illustrating downlink phase calibration of a feeder on the communication node side according to an embodiment of the present disclosure.

Referring to FIG. 9, since on active antenna unit (AAU) side of the communication node, odd-numbered ANTs are polarized at +45°, and even-numbered ANTs are polarized at −45°, odd numbers are used as a reference to calibrate even numbers and even numbers are used as a reference to calibrate odd numbers when calibrating a cable. Taking ANT1 as the reference, phase differences between ANT1 and ANT2, ANT1 and ANT4, ANT1 and ANT6 . . . ANT1 and ANT16, delatBSDLPhase2, delatBSDLPhase4, delatBSDLPhase6, . . . , delatBSDLPhase16 are obtained. In the same way, taking ANT2 as the reference, the phase differences delatBSDLPhase1, delatBSDLPhase3, delatBSDLPhase5, . . . , DelatBSDLPhase15 between ANT2 and ANT1, ANT2 and ANT3, ANT2 and ANT5, . . . ANT2 and ANT15, are obtained. Then phase values -elatBSDLPhase1, -delatBSDLPhase2, -delatBSDLPhase3, . . . , -delatBSDLPhase14, -delatBSDLPhase15, -delatBSDLPhase16 are used to perform the downlink phase compensation on the communication node side.

Figure 10:
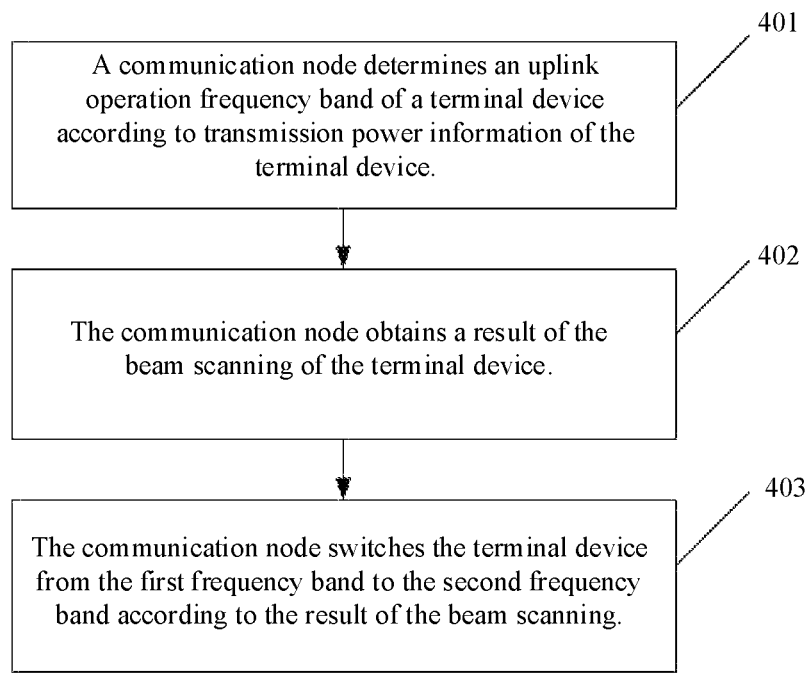
FIG. 10 is a schematic flowchart illustrating a frequency band switching method according to an embodiment of the present disclosure (applied to a communication node)

As shown in FIG. 10, a frequency band switching method provided by some embodiments of the present disclosure is applied to a communication node. The method includes the following steps.

In step 401, a communication node determines an uplink operation frequency band of a terminal device according to transmission power information of the terminal device.

The communication node may be a base station, and the terminal device may be a UE.

In an embodiment, the transmission power information includes a power headroom, which is a difference between a maximum transmission power and an actual transmission power. The step 401 includes: determining, by the communication node, that the uplink operation frequency band of the terminal device needs to be switched, and instructing the terminal device to switch the uplink operation frequency band from the first frequency band to the second frequency band, when the power headroom is zero.

In other embodiments, it is also possible that the terminal device independently determines the frequency band switching, and actively initiates a switching request to the communication node.

In an embodiment, the method further includes: sending, by the communication node, a public broadcast message to the terminal device, wherein the public broadcast message carries information of the second frequency band to which the terminal device is capable to switch.

Herein, by sending the public broadcast message carrying information of the second frequency band to which the terminal device may switch, the terminal device may perform a beam scanning according to the information of the switchable second frequency band.

In step 402, the communication node obtains a result of the beam scanning of the terminal device.

Herein, the result of the beam scanning may include an energy of each beam in the second frequency band.

In step 403, the communication node switches the terminal device from the first frequency band to the second frequency band according to the result of the beam scanning.

In an embodiment, the communication node accesses the terminal device in a direction of a strongest beam in the second frequency band.

The communication node selects the direction of the strongest beam to access the terminal device according to the energy of the each beam in the second frequency band, and activates only one beam with the strongest signal or a superposition beam of the strongest signal beam and the strongest beam nearby during an entire service communication process. This mechanism may save the power consumption of the communication node and improving the centralized utilization of energy by the communication node.

In an embodiment, the method further includes: performing, by the communication node, phase compensation.

Herein, the phase compensation includes downlink phase compensation and uplink phase compensation.

In an embodiment, performing the downlink phase compensation on a feeder at the communication node side includes: acquiring, by the communication node, phase difference information sent by the terminal device, and performing the compensation according to the phase difference information, where the phase difference information comprises phase difference information of a −45° polarized antenna calibrated by taking a +45° polarized antenna as a reference, and phase difference information of the +45° polarized antenna calibrated by taking the −45° polarized antenna as the reference.

Referring to FIG. 9, since on active antenna unit side of the communication node, odd-numbered ANTs are polarized at +45°, and even-numbered ANTs are polarized at −45°, odd numbers are used as a reference to calibrate even numbers and even numbers are used as a reference to calibrate odd numbers when calibrating a cable. Taking ANT1 as the reference, phase differences between ANT1 and ANT2, ANT1 and ANT4, ANT1 and ANT6 . . . ANT1 and ANT16, delatBSDLPhase2, delatBSDLPhase4, delatBSDLPhase6, . . . , delatBSDLPhase16 are obtained. In the same way, taking ANT2 as the reference, the phase differences delatBSDLPhase1, delatBSDLPhase3, delatBSDLPhase5, . . . , DelatBSDLPhase15 between ANT2 and ANT1, ANT2 and ANT3, ANT2 and ANT5, . . . ANT2 and ANT15, are obtained. Then phase values -elatBSDLPhase1, -delatBSDLPhase2, -delatBSDLPhase3, . . . , -delatBSDLPhase14, -delatBSDLPhase15, -delatBSDLPhase16 are used to perform the downlink phase compensation on the communication node side.

In an embodiment, the method further includes: performing the uplink phase compensation on a feeder on the communication node side.

In an embodiment, the performing the uplink phase compensation on the feeder line on the communication node side includes: receiving, by the communication node, a sounding reference signal (SRS) transmitted by the terminal device, measuring a phrase of each antenna port obtained by receiving the SRS signal and performing the compensation respectively according to the phase corresponding to the each antenna port.

For example, uplink SRS signals are transmitted at the ANT1 on the terminal device side, and phase information are obtained at the 16 ANTs on the communication node side, which are delatBSULPhase1, delatBSULPhase2, delatBSULPhase3, . . . , delatBSULPhase14, delatBSULPhase15, delatBSULPhase16, respectively. Then the opposite number of the measured phase, -delatBSULPhase1, -delatBSULPhase2, -delatBSULPhase3, . . . , -delatBSULPhase14, -delatBSULPhase15, -delatBSULPhase16 are compensated to uplink channels of the communication node.

Figure 11:
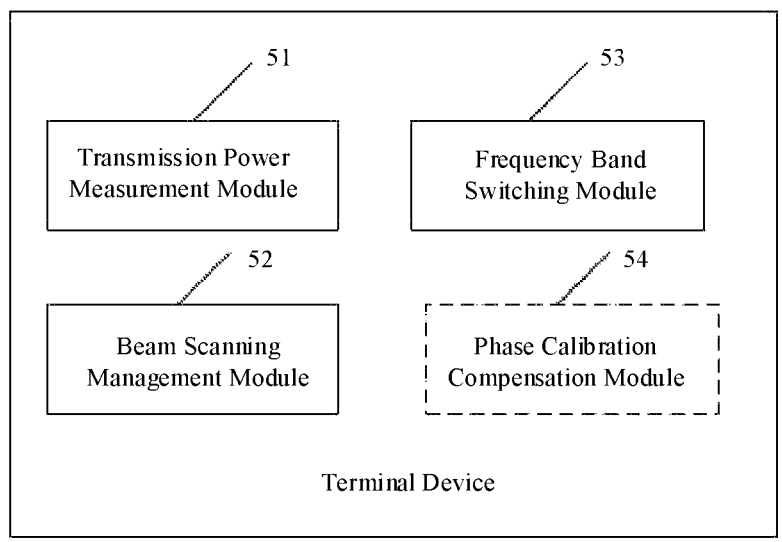
FIG. 11 is a schematic diagram illustrating composition of a frequency band switching apparatus according to an embodiment of the present disclosure (applied to the terminal device)

As shown in FIG. 11, the frequency band switching apparatus provided by some embodiments of the present disclosure applied to a terminal device includes: a transmission power measurement module 51, a beam scanning management module 52 and a frequency band switching module 53.

The transmission power measurement module 51 is configured to determining whether an uplink operation frequency band needs to be switched according to transmission power information of a terminal device, when the uplink operation of the terminal device is performed in a first frequency band.

The transmission power measurement module 51 may measure to determine whether the transmission power of the terminal device reaches a maximum value configured by the communication node.

The beam scanning management module 52 is configured to perform a beam scanning on a second frequency band to switch to.

When controlling a beam terminal to switch the frequency band, the beam scanning management module 52 initiates an access to the communication node in a direction of a strongest beam by scanning beams.

The frequency band switching module 53 is configured to switch to the second frequency band according to a result of the beam scanning.

The frequency band switching module 53 is configured to switch to an uplink frequency band.

In an embodiment, the apparatus further includes: a phase calibration compensation module 54.

The phase calibration and compensation module 54 is configured to receive signals from the communication node, and perform phase calibration and compensation.

The phase calibration compensation module 54 may be used to eliminate a phase difference of communication components (radio frequency feeder, electronic components, etc.), thereby improving the accuracy and reliability of 3D MIMO beamforming.

With the continuous development of 3D MIMO, accurate phase is extremely important for beamforming in 3D MIMO. A channel phase difference may cause inaccurate beamforming or beamforming failure, thus getting half the result with twice the effort.

In an embodiment, the transmission power information includes an actual transmission power and a maximum transmission power, and the transmission power measurement module 51 is configured to obtain the actual transmission power of the terminal device when the uplink operation of the terminal device is performed in the first frequency band; compare the actual transmission power with the maximum transmission power, and determine to switch the frequency band of the uplink operation to the second frequency band when the actual transmission power is equal to the maximum transmission power.

In an embodiment, the transmission power information includes a power headroom, which is a difference between the maximum transmission power and the actual transmission power, and the transmit power measurement module 51 is configured to obtain the actual transmission power of the terminal device when the uplink operation of the terminal device is performed in the first frequency band; determine the power headroom according to the actual transmission power, send the power headroom to the communication node, and determine to switch the frequency band of the uplink operation to the second frequency band according to an instruction of the communication node.

In an embodiment, the beam scanning management module 52 is configured to scan a frequency spectrum corresponding to each beam in the second frequency band to obtain a power corresponding to the each beam.

In an embodiment, the beam scanning management module 52 is further configured to receive a public broadcast message sent by the communication node, and the public broadcast message carries information of the second frequency band to which the terminal device may switch.

In an embodiment, the frequency band switching module 53 is configured to initiate an access to a direction of a strongest beam in the second frequency band according to the beam scanning result.

In an embodiment, the phase calibration compensation module 54 is configured to receive signals from the communication node at radio frequency ports, measure a phase of each of the radio frequency ports obtained by receiving the signals, and perform the compensation according to the obtained phase corresponding to each of the radio frequency ports.

In an embodiment, the phase calibration compensation module 54 is further configured to detect phase difference information according to the signals received from the communication node, and send the phase difference information to the communication node, where the phase difference information includes phase difference information of a −45° polarized antenna calibrated by taking a +45° polarized antenna as a reference, and phase difference information of the +45° polarized antenna calibrated by taking the −45° polarized antenna as the reference.

An application example is described below. In this application example, the terminal device is a UE, and the communication node is a base station.

Figure 12:
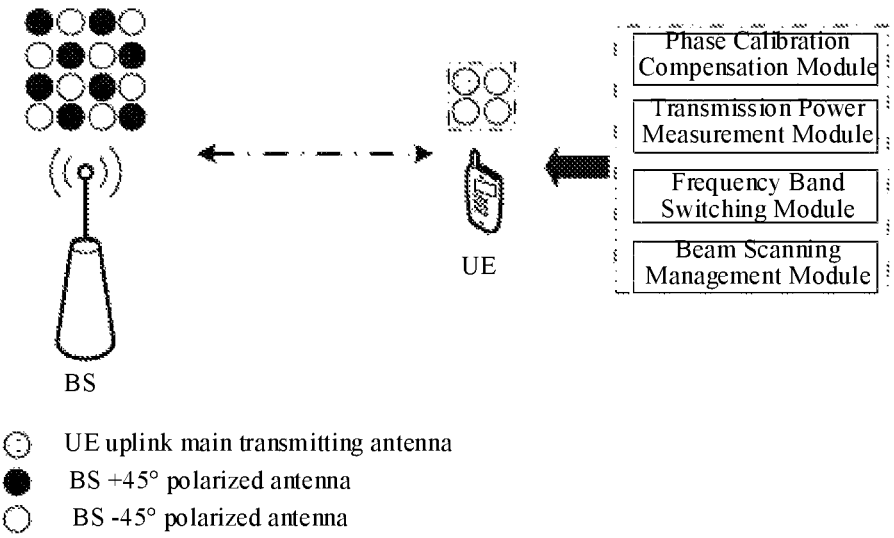
FIG. 12 is a schematic diagram illustrating an interaction between a UE and a BS according to an application example of the present disclosure.
Figure 13:
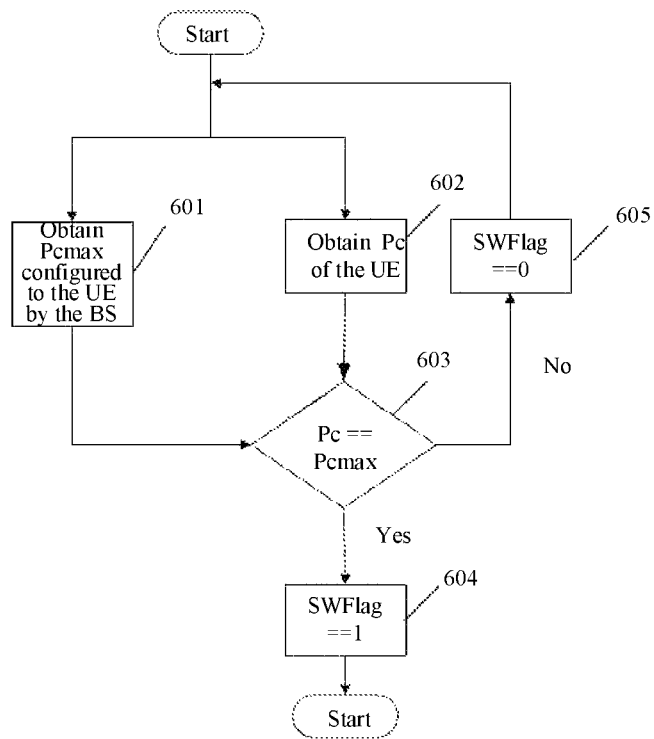
FIG. 13 is a schematic diagram illustrating execution steps of a transmission power measurement module according to an application example of the present disclosure.

Referring to FIG. 12 and FIG. 13, the transmission power measurement module performs the following operations.

In step 601, a maximum transmission power Pcmax configured to the UE by the BS is obtained.

In step 602, an actual transmission power Pc of the UE is obtained.

In an embodiment, the steps 601 and 602 may be performed at the same time.

In step 603, it is determined if Pc is equal to Pcmax, if so, step 604 is performed, and if not, step 605 is performed.

In step 604, a switching flag SWFlag=1 is set, and the frequency band switching module is notified to perform a frequency band switching operation.

In step 605, SWFlag=0 is set, and the operation returns to step 602.

The frequency band switching module is used for switching the uplink frequency band. After receiving the measurement result of the transmission power measurement module, the frequency band switching module notifies the beam scanning management module to perform a beam scanning according to the measurement result, and perform the frequency band switching according to the scanning result of the beam scanning management module.

When the SWFlag transmitted by the transmit power measurement module is equal to 1, the UE switches the uplink from a high-frequency band to a low-frequency band, which weakens the difference between uplink and downlink coverage, enhances uplink coverage, so as to improve uplink services and enhance uplink spectrum utilization.

The base station may notify the switchable low-frequency frequency band in the public broadcast message, and when the UE meets a switching condition, the UE performs the relevant frequency band switching action. Or, the UE may report the power headroom (UE maximum transmission power-UE actual transmission power) to the base station. When the power headroom of the base station is 0, it means that the UE transmission power has reached the maximum transmission power, and the corresponding frequency band switching is performed.

When the UE switches frequency bands, the UE initiates the access in the direction of the strongest beam of the base station by scanning beams, and activates only one beam with the strongest signal or a superimposed beam of the strongest signal beam and the strongest beam nearby during an entire service communication process. This mechanism may save the power consumption of the base station and improve the centralized utilization of energy by the base station.

In an embodiment, when the UE receives the measurement result of the transmission power measurement module, that is, SWFlag=1 (that is, the actual transmission power of the UE has reached the maximum UE transmission power allowed by the base station), the UE starts scanning the base station's low-frequency beams. As shown in FIG. 7, the UE starts to scan frequency spectrums 1-8 respectively to obtain multiple low-frequency powers Power1, Power2, Power8. The UE reports energy of the corresponding beam to the base station through the high-frequency spectrum, and the base station switches to a low frequency band beam, notify the UE to initiate the access at the low-frequency spectrum, and continue to transmit interrupted data.

The frequency band switching proposed in the embodiments of the present disclosure may improve uplink coverage, uplink traffic, and uplink spectrum efficiency through the frequency band switching when there is a large difference between the uplink and downlink coverage at mid-to-far points and far points. The frequency band switching proposed in the embodiments of the present disclosure may obtain accurate phase by performing phase compensation, which may improve the performance of beamforming (BF) to make BF more accurate and enable the UE to accurately send the position to the BS.

Figure 14:
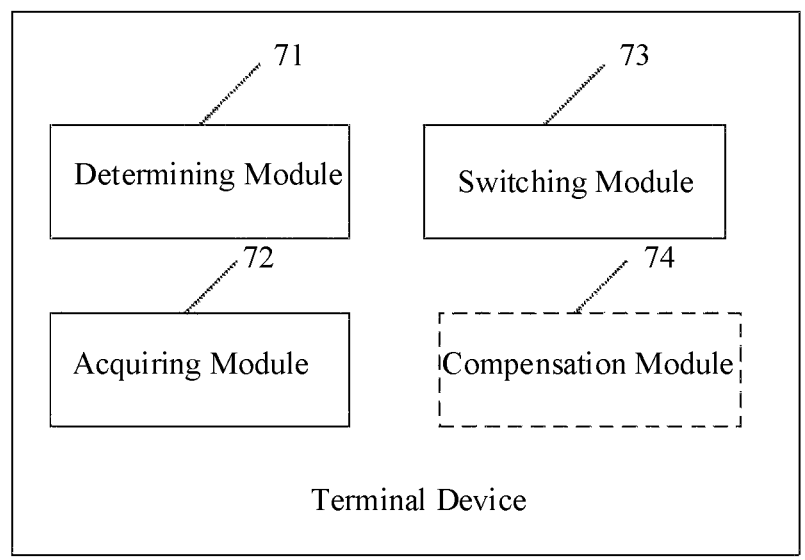
FIG. 14 is a schematic diagram illustrating composition of a frequency band switching apparatus according to an embodiment of the present disclosure (applied to the communication node).

As shown in FIG. 14, some embodiments of the present disclosure also provide a frequency band switching apparatus, which is applied to a communication node. The method includes: a determining module 71, an acquiring module 72, and a switching module 73.

The determining module 71 is configured to determine an uplink operation frequency band of a terminal device according to transmission power information of the terminal device.

The obtaining module 72 is configured to obtain a beam scanning result of the terminal device.

The switching module 73 is configured to switch the terminal device from a first frequency band to a second frequency band according to the beam scanning result.

In an embodiment, the transmission power information includes a power headroom, which is a difference between a maximum transmission power and an actual transmission power, and the determining module 71 is configured to: determine that the terminal device needs to switch the frequency band of the uplink operation when the power headroom is zero, and instruct the terminal device to switch the frequency band of the uplink operation from the first frequency band to the second frequency band.

In an embodiment, the apparatus further includes a sending module configured to: send a public broadcast message to the terminal device, where the public broadcast message carries information of the second frequency band to which the terminal device may switch.

In an embodiment, the switching module 73 is configured to: access the terminal device in a direction of a strongest beam in the second frequency band.

In an embodiment, the device further includes: a compensation module 74.

The compensation module 74 is configured to perform a downlink phase compensation.

In an embodiment, the compensation module 74 is configured to: acquire phase difference information sent by the terminal device, and perform the compensation according to the phase difference information, where the phase difference information includes phase difference information of a −45° polarized antenna calibrated by taking a +45° polarized antenna as a reference, and phase difference information of the +45° polarized antenna calibrated by taking the −45° polarized antenna as the reference.

In an embodiment, the compensation module 74 is further configured to perform an uplink phase compensation.

In an embodiment, the compensation module 74 is configured to: receive a sounding reference signal SRS transmitted by the terminal device, measure a phase of each antenna port obtained by receiving the SRS signal, and perform the compensation according to the phase corresponding to each of the antenna ports.

Some embodiments of the present disclosure also provide a terminal device, including a memory, a processor, and a computer program stored on the memory and capable of running on the processor, where the computer program, when being executed by the processor, implements the frequency band switching method.

Some embodiments of the present disclosure also provide a communication node, including a memory, a processor, and a computer program stored on the memory and capable of running on the processor, where the computer program, when being executed by the processor, implements the frequency band switching method.

Some embodiments of the present disclosure also provide a computer-readable storage medium storing a computer-executable instruction that is used to execute the frequency band switching method.

In this embodiment, the above-mentioned storage medium may include: universal serial bus flash disk (U Disk), read-only memory (ROM), random access memory (RAM), mobile hard disks, magnetic disks or CD-ROMs and other media that may store program codes.

All or some of the steps, systems and functional modules/units in the methods disclosed above may be implemented as software, firmware, hardware, and appropriate combinations thereof. In the hardware implementation, the division between functional modules/units mentioned in the above description does not necessarily correspond to the division of physical components. For example, a physical component may have multiple functions, or a function or step may be performed by multiple physical components in cooperation. Some or all of the components may be implemented as software executed by a processor, such as a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). The term computer storage medium includes volatile and non-volatile, removable and non-removable medium implemented in any method or technology for storing information (such as computer-readable instructions, data structures, program modules, or other data). Computer storage medium include RAM, ROM, electrically erasable programmable read-only memory (EEPROM), flash memory or other memory technologies, and portable compact disc read-only memory (CD-ROM), digital video disk (DVD) or other optical disk storage, magnetic cassettes, magnetic tape, magnetic disk storage or other magnetic storage devices, or any other medium that may be used to store desired information and that may be accessed by a computer. Communication medium usually contain computer readable instructions, data structures, program modules, or other data in a modulated data signal such as a carrier wave or other transmission mechanism, and may include any information delivery medium.

What is claimed is:

1. A frequency band switching method, comprising:
   determining whether an uplink operation frequency band needs to be switched according to transmission power information of a terminal device, when the uplink operation of the terminal device is performed in a first frequency band;
   performing, by the terminal device, a beam scanning operation on a second frequency band to switch to; and
   switching, by the terminal device, to the second frequency band according to a result of the beam scanning operation; and
   the method further comprising:
   receiving, by the terminal device, signals of a communication node, and performing phase calibration and compensation.

2. The method according to claim 1, wherein the transmission power information comprises an actual transmission power and a maximum transmission power, and determining whether the uplink operation frequency band needs to be switched according to transmission power information of the terminal device, when the uplink operation of the terminal device is performed in the first frequency band comprises:
   obtaining the actual transmission power of the terminal device when the uplink operation of the terminal device is performed in the first frequency band; and
   comparing, by the terminal device, the actual transmission power with the maximum transmission power, and determining to switch the frequency band of the uplink operation to the second frequency band if the actual transmission power is equal to the maximum transmission power.

3. The method according to claim 1, wherein the transmission power information comprises a power headroom, wherein the power headroom is a difference between a maximum transmission power and an actual transmission power, and determining whether the uplink operation frequency band needs to be switched according to transmission power information of the terminal device, when the uplink operation of the terminal device is performed in the first frequency band comprises:

obtaining the actual transmission power of the terminal device when the uplink operation of the terminal device is performed in the first frequency band;

determining, by the terminal device, the power headroom according to the actual transmission power, sending the power headroom to a communication node, and determining to switch the frequency band of the uplink operation to the second frequency band according to an instruction of the communication node.

4. The method according to claim 1, wherein, before performing, by the terminal device, the beam scanning on the second frequency band to switch to, the method further comprises:

receiving, by the terminal device, a public broadcast message sent by a communication node, wherein the public broadcast message carries information of the second frequency band to which the terminal device is capable to switch.

5. The method according to claim 1, wherein the performing, by the terminal device, the beam scanning on the second frequency band to switch to comprises:

scanning, by the terminal device, frequency spectrum corresponding to each beam in the second frequency band to obtain a power corresponding to the each beam.

6. The method according to claim 1, wherein the switching, by the terminal device, to the second frequency band according to the result of the beam scanning comprises:

initiating, by the terminal device, an access to a direction of a strongest beam in the second frequency band according to the result of the beam scanning.

7. The method according to claim 1, wherein receiving, by the terminal device, the signals of the communication node, and performing the phase calibration and compensation comprises:

receiving, by the terminal device, the signals from the communication node at radio frequency ports, measuring a phase of each of the radio frequency ports obtained by receiving the signals, and performing the compensation according to the obtained phase corresponding to each of the radio frequency ports.

8. The method according to claim 1, further comprising:

detecting, by the terminal device, phase difference information according to signals received from a communication node, and sending the phase difference information to the communication node, wherein the phase difference information comprises phase difference information of a −45° polarized antenna calibrated by taking a +45° polarized antenna as a reference, and phase difference information of the +45° polarized antenna calibrated by taking the −45° polarized antenna as the reference.

9. The method according to claim 1, wherein:

the first frequency band is a fifth-generation mobile communication technology (5G) frequency band, and the second frequency band is a fourth-generation mobile communication technology (4G) frequency band.

10. A frequency band switching method, comprising:

determining, by a communication node, an uplink operation frequency band of a terminal device according to transmission power information of the terminal device;

acquiring, by the communication node, a result of beam scanning from the terminal device;

switching, by the communication node, the terminal device from a first frequency band to a second frequency band according to the result of beam scanning; and wherein the transmission power information comprises a power headroom, wherein the power headroom is a difference between a maximum transmission power and an actual transmission power, and the determining, by the communication node, the uplink operation frequency band of the terminal device according to the transmission power information of the terminal device comprises:

determining, by the communication node, that the uplink operation frequency band of the terminal device needs to be switched, and instructing the terminal device to switch the uplink operation frequency band from the first frequency band to the second frequency band when the power headroom is zero.

11. The method according to claim 10, further comprising:

sending, by the communication node, a public broadcast message to the terminal device, wherein the public broadcast message carries information of the second frequency band to which the terminal device is capable to switch.

12. The method according to claim 10, wherein the switching, by the communication node, the terminal device from the first frequency band to the second frequency band according to the result of the beam scanning comprises:

accessing, by the communication node, the terminal device in a direction of a strongest beam in the second frequency band.

13. The method according to claim 10, further comprising:

performing, by the communication node, downlink phase compensation.

14. The method according to claim 13, wherein the performing, by the communication node, the downlink phase compensation comprises:

acquiring, by the communication node, phase difference information sent by the terminal device, and performing the compensation according to the phase difference information, wherein the phase difference information comprises phase difference information of a −45° polarized antenna calibrated by taking a +45° polarized antenna as a reference, and phase difference information of the +45° polarized antenna calibrated by taking the −45° polarized antenna as the reference.

15. The method according to claim 10, further comprising:

performing, by the communication node, uplink phase compensation.

16. The method according to claim 15, wherein the performing, by the communication node, the uplink phase compensation comprises:

receiving, by the communication node, a sounding reference signal SRS transmitted by the terminal device, measuring a phase of each antenna port obtained by receiving the SRS signal, and performing the compensation according to the phase corresponding to each of the antenna ports.

17. A terminal device, comprising: a memory, a processor, and a computer program stored on the memory and capable of running on the processor, wherein the computer program, when being executed by the processor, implements a frequency band switching method, wherein, the frequency band switching method comprises:

determining whether an uplink operation frequency band needs to be switched according to transmission power information of a terminal device, when the uplink operation of the terminal device is performed in a first frequency band;

performing, by the terminal device, beam scanning on a second frequency band to switched to; and switching, by the terminal device, to the second frequency band according to a result of the beam scanning; and the frequency band switching method further comprises:

receiving, by the terminal device, signals of a communication node, and performing phase calibration and compensation.

18. The terminal device according to claim 17, wherein, the transmission power information comprises an actual transmission power and a maximum transmission power, and determining whether the uplink operation frequency band needs to be switched according to transmission power information of the terminal device, when the uplink operation of the terminal device is performed in the first frequency band comprises:

obtaining the actual transmission power of the terminal device when the uplink operation of the terminal device is performed in the first frequency band; and comparing, by the terminal device, the actual transmission power with the maximum transmission power, and determining to switch the frequency band of the uplink operation to the second frequency band if the actual transmission power is equal to the maximum transmission power.

* * * * *